United States Patent [19]

Fraisse

[11] Patent Number: 5,220,479
[45] Date of Patent: Jun. 15, 1993

[54] ELECTRONIC TRIP DEVICE WHOSE FRONT PANEL IS FORMED BY A FLAT SCREEN DISPLAY

[75] Inventor: Didier Fraisse, Saint Martin D'Heres, France

[73] Assignee: Merlin Gerin, Meylan, France

[21] Appl. No.: 611,776

[22] Filed: Nov. 9, 1990

[30] Foreign Application Priority Data

Nov. 16, 1989 [FR] France ............... 89 15155

[51] Int. Cl.⁵ ............................................. H02H 3/04
[52] U.S. Cl. ..................................... 361/97; 340/664
[58] Field of Search ................... 361/93, 94, 95, 96, 361/97, 87, 62, 63; 340/657, 664, 517, 524

[56] References Cited

U.S. PATENT DOCUMENTS

| | | | |
|---|---|---|---|
| 4,266,105 | 5/1981 | Perkins | 200/50 A |
| 4,429,340 | 1/1984 | Howell | 361/96 |
| 4,780,786 | 10/1988 | Weynachter et al. | 361/87 |
| 4,991,042 | 2/1991 | Tokarski et al. | 340/664 |
| 5,019,956 | 5/1991 | Nakayama et al. | 361/87 |
| 5,038,246 | 8/1991 | Durivage, III | 361/93 |

FOREIGN PATENT DOCUMENTS 0226530 6/1987 European Pat. Off. .
0279691 8/1988 European Pat. Off. .

OTHER PUBLICATIONS

Patent Abstracts of Japan, Publication No. 62280655. (Shikoko Electric Power) May, 12, 1987 vol. 12, No. 166 (P-704).

Primary Examiner—A. D. Pellinen
Assistant Examiner—Ronald W. Leija
Attorney, Agent, or Firm—Parkhurst, Wendel & Rossi

[57] ABSTRACT

The front panel of the trip device is formed by a flat screen display, for example liquid crystal, controlled by the trip device microprocessor. The display provides a permanent display of the information relating to the type of trip device, the tripping parameters and measured values, from data entered in the trip device memory. Display is in alphanumeric and/or graphic form.

10 Claims, 3 Drawing Sheets

ELECTRONIC TRIP DEVICE WHOSE FRONT PANEL IS FORMED BY A FLAT SCREEN DISPLAY

BACKGROUND OF THE INVENTION

The invention relates to an electronic trip device comprising an electronic processing unit, comprising a microprocessor and at least one backed-up random-access memory, receiving output signals from measuring means of the current flowing in conductors to be protected and designed to produce a tripping signal in the event of said signals overshooting preset tripping parameters, a front panel comprising indications relative to the type of trip device, fault indication means, and a display device designed to display the tripping parameters and/or various quantities measured by the trip device.

In state-of-the-art electronic trip devices, the front panel of the trip device comprises at least fault indication means, generally in the form of an indicator lamp, electromechanical means, potentiometers, switches or keys, enabling the tripping thresholds to be adjusted, and a label on which the indications relating to the manufacturer and type of trip device are printed. In certain trip devices a display device is provided to display measured values and/or tripping parameters.

The number of different labels that can be associated with a trip device can be very large, around one hundred, due to the large number of possible options.

SUMMARY OF THE INVENTION

The object of the invention is to achieve standardization of the trip devices, without limiting the number of possible options and by eliminating if possible any risk of a mismatch between the label on the front panel of the trip device and the functions actually performed by the trip device.

According to the invention, this object is achieved in that the front panel of the trip device is formed by a flat screen display device, controlled by the microprocessor and connected to an internal battery so as to give a permanent display of various data contained in the memory and made up at least of indications relating to the type of trip device, of the tripping parameters and of fault indication, the trip device comprising receiving means connected to the microprocessor and designed to cooperate with transmission means of a remote control device comprising means of remotely modifying the tripping parameters contained in the memory.

Thus, the front panel label and indication devices are replaced by a liquid crystal display controlled by the trip device microprocessor. This display preferably occupies the whole of the front panel. The information displayed necessarily corresponds to the memory data taken into account by the trip device when processing the signals. A single, standard display replaces the various labels hitherto necessary to individualize a trip device in terms of the various possible options.

The display is preferably a liquid crystal display.

The use of a remote control to modify the tripping parameters enables any electromechanical component, potentiometer, switch or key to be removed from the front panel of the trip device. Electrostatic discharge problems are thus essentially eliminated. The processing unit can then be disposed on one (or more) boards of the printed circuit which, in the absence of mechanical parts, can be covered with varnish, thus improving the response of the unit to climatic stresses. The elimination of these electromechanical parts moreover results in a large gain in volume on the printed circuit boards. According to a development of the invention, the indications relating to the type of trip device are entered in the memory remotely by means of a specific remote control device, and preferably these indications are not subsequently modifiable, after they have been entered in the memory.

BRIEF DESCRIPTION OF THE DRAWINGS

Other advantages and features will become more clearly apparent from the following description of illustrative embodiments of the invention, given as non-restrictive examples only and represented in the accompanying drawings, in which.

DESCRIPTION OF THE PREFERRED EMBODIMENT

Figure 1:
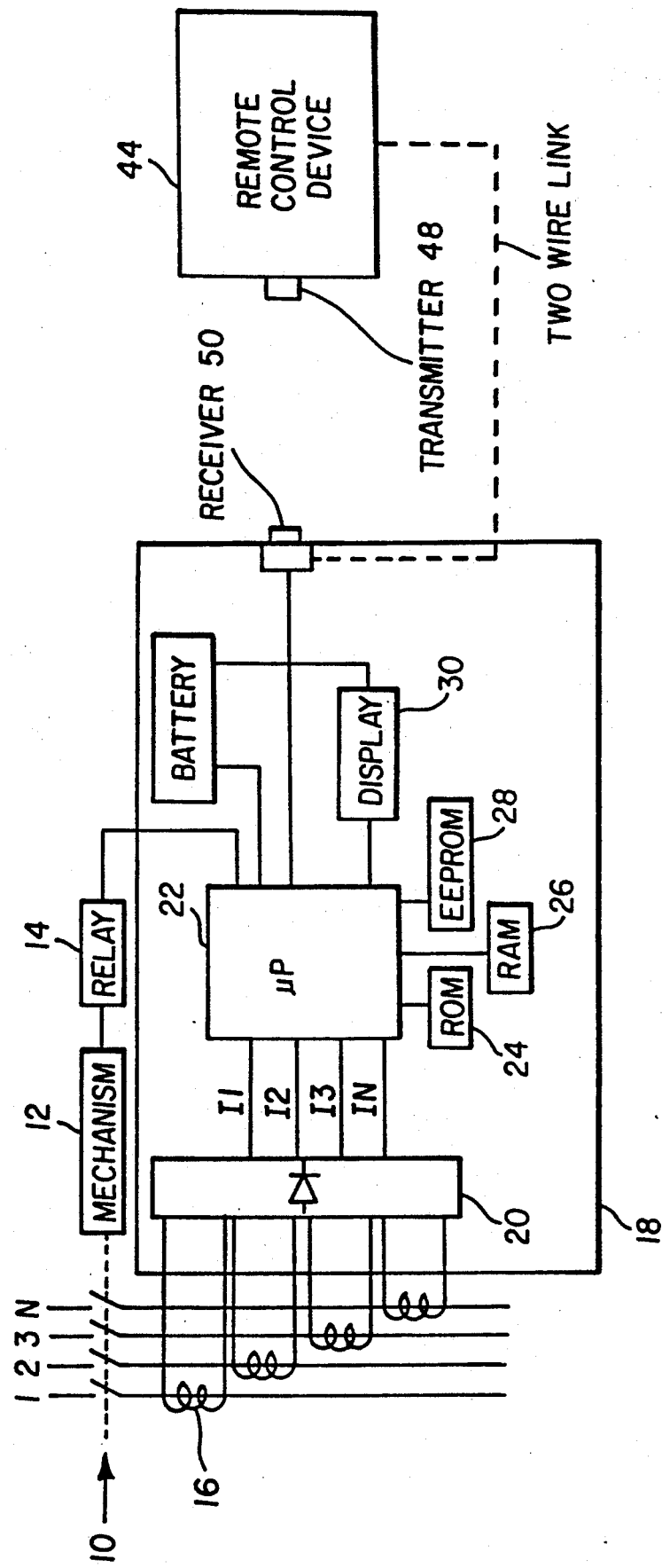
FIG. 1 represents a simplified block diagram of a trip device in which the invention can be implemented.

In FIG. 1, a three-phase electrical distribution system, comprising three phase conductors 1, 2, 3 and a neutral conductor N comprises a circuit breaker 10 capable of interrupting the circuit in the open position. The mechanism 12 of the circuit breaker 10 is controlled by a polarized relay 14 ordering tripping of the circuit breaker in the event of an overload or short-circuit. Each conductor (1, 2, 3, N) has associated with it a current transformer 16 which delivers an analog signal representative of the current flowing in the associated conductor. These signals are applied to the trip device 18 which comprises a rectifying and shaping circuit 20 whose outputs I1, I2, I3 and IN are applied to a microprocessor-based electronic processing unit 22 an output of which controls the polarized relay 14. The microprocessor is connected to various auxiliaries (not represented) necessary for its operation, and to at least one Read-Only Memory (ROM) 24 and one Random Access Memory (RAM) 26. In FIG. 1, the microprocessor is connected to a third memory 28, which is a backed-up Random Access Memory or, preferably, an Electrically Erasable Programable Read-Only Memory (EEPROM or NOVRAM). The microprocessor is furthermore connected to a display device 30.

The trip device performs, in a known manner, various protection functions when a fault or an overload occur in the distribution system to be protected.

Figure 2:
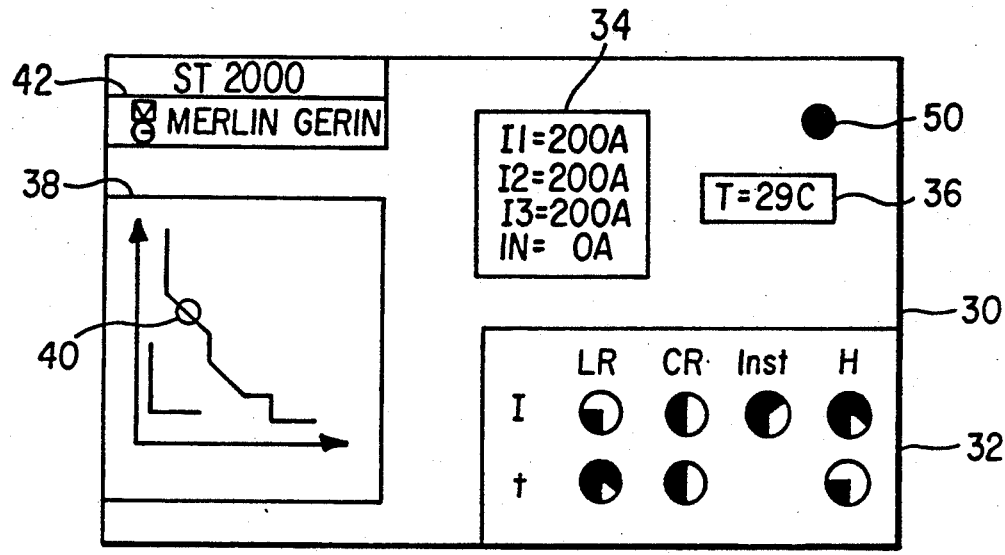

As represented in FIG. 2, the front panel of the trip device 18, arranged in such a way as to be seen by a user, is formed by the front panel of the display device 30, the latter being a liquid crystal type display.

On the display device 30 there is a permanent display of the information relating to the tripping parameters (zone 32), i.e. the thresholds (I) and time delays (t) of the various tripping functions of the trip device, for example the long delay (LR), short delay (CR), instantaneous (Inst) and ground fault (H) functions. In the embodiment represented in FIG. 2, this information is represented by a combination of alphanumeric signs (LR, CR, Inst, H, I, t) and analog type diagrams, in the form of circular segments, corresponding to a graphic representation of potentiometers or switches.

Other zones, 34 and 36, of the display device can be used for display of measured values, for example phase (I1, I2, I3) and neutral (IN) currents and temperature (T).

The display also indicates a certain number of items of information representative of the type of trip device. In FIG. 2, this information is of both alphanumeric type (ST 2000, parameters of zone 32 corresponding to the functions actually performed by the trip device) and graphic type such as the tripping curves (zone 38).

Indication of a fault is also performed by the display. In FIG. 2, a point 40 situated on the long delay tripping curve indicates a trip due to a long delay fault. This same point, for example flashing, can also be used to indicate an overshoot of the long delay threshold which has not yet led to a trip.

Finally, various information relating to the manufacturer, for example the company logo and name, is also indicated on the display (zone 42).

The front panel of the trip device 18 thus comprises, on the display device 30, all the information concerning the trip device which interests a user.

Display of the information is performed under the control of the microprocessor, the various items of information to be displayed being contained in the memory 28 (EEPROM). If the trip device is a system-powered trip device, i.e. supplied by the system to be protected, an auxiliary battery is provided in the trip device so as to conserve the display even when the circuit breaker is open.

As the data displayed corresponds to the data stored in the trip device memory and used by the microprocessor to perform the various protection functions provided in a particular trip device, there is no risk of a mismatch arising between the information displayed on the front panel of the trip device and the functions actually performed by the trip device. In particular, there is no risk of the type of trip device and the tripping curves not corresponding to the type of trip device actually used, whereas such an error was possible in prior art trip devices where a label was stuck onto the front panel of the trip device at the time of manufacturing.

Unlike state-of-the-art trip devices, the front panel of the trip device does not comprise any potentiometers, switches or keys enabling the tripping parameters to be modified.

Figure 3:
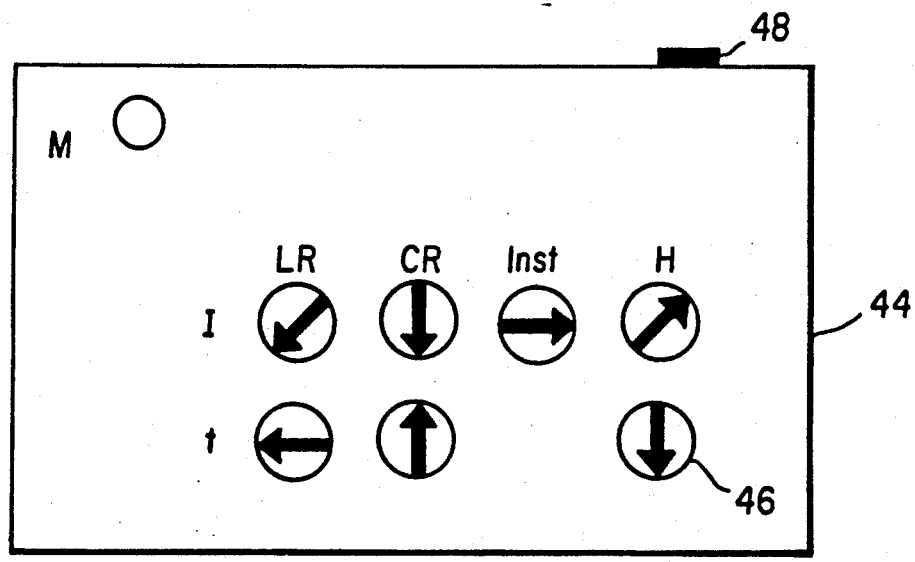

In the embodiment represented in FIGS. 2 and 3, an infra-red link enables the tripping parameters to be modified via a remote control device 44. The remote control device 44 comprises a plurality of potentiometers 46 enabling the various tripping parameters to be adjusted. This device is preferably formed by a standard housing comprising as many potentiometers, switches or keys as are necessary to modify the tripping parameters of a trip device comprising the maximum possible options. When a parameter is adjusted to the required value, a send key M triggers transmission of the corresponding data, by means of a transmitter 48 of the remote control device and a receiver 50 located on the front panel of the trip device. Receipt of data by the receiver 50, connected to the trip device microprocessor, leads to the parameter involved being modified in the memory 28 and consequently in the zone 32 of the display 30.

A single standard remote control housing 44 can be used to successively adjust several trip devices.

Figure 4:
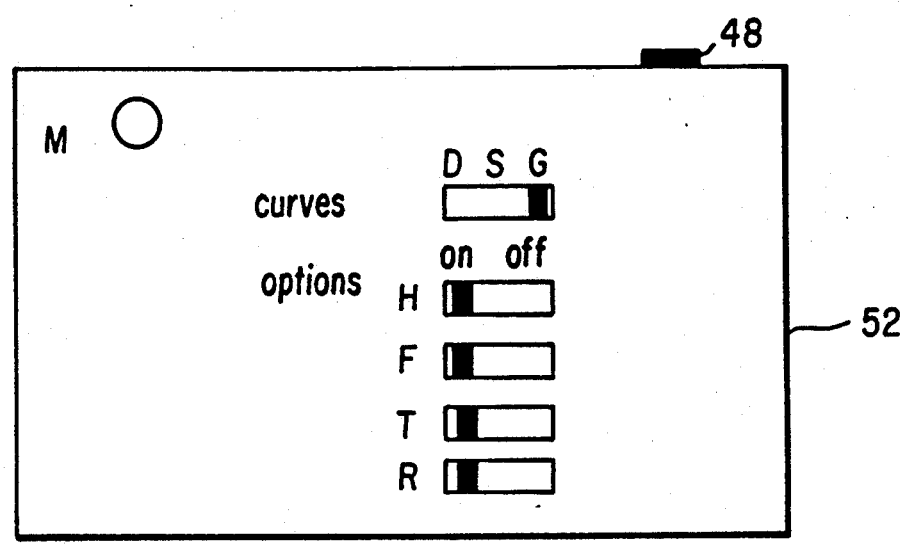
FIGS. 3 and 4, illustrate particular embodiments of remote control devices designed to cooperate with the trip device.

FIG. 4 illustrates a remote control device 52 designed to configure the trip device, i.e. determine the options it has to perform. In the embodiment represented, the device 52 comprises a switch with three positions D, S and G, enabling three types of curves to be selected separately. A certain number of two-position switches (ON/OFF) enable it to be determined whether a trip device should comprise corresponding options or not, for example a ground fault tripping function (H), fault type indication (F), or a load reconnection function (R).

Like the remote control device 44, the remote control device 52 communicates with the trip device by means of an infra-red link, a transmitter 48 cooperating with the receiver 50 of the trip device.

Configuration of the trip device is preferably carried out at the end of manufacturing. The switches corresponding to the options selected for a particular trip device are set to the ON position and the M transmission key of the remote control device is actuated, causing the corresponding data to be transmitted to the trip device. The trip device microprocessor stores this data in memory 28, and uses this stored data to determine which sub-routines contained in the Read-Only Memory 24 it will have to use to process the data. The stored data is also used to determine the type of information to be displayed. For example, if the trip device is not to perform a load reconnection function, the switch corresponding to the option R of the remote control device being in the OFF position when the trip device is configured, the graphic representation of the switch R does not appear in zone 32 of the display. In this way, the user knows exactly which functions are performed by the trip device and actuating the corresponding potentiometer R of the remote control device 44 has no influence on the trip device.

The choice of an option can be made irreversible, by programming, after configuration.

Figure 5:
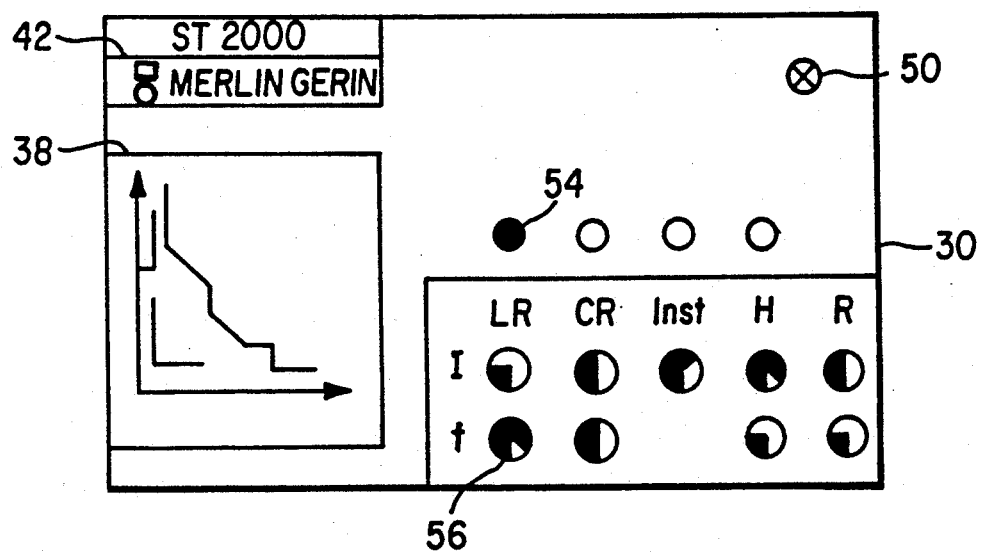
FIGS. 2 and 5 represent particular embodiments of the front panel of the trip device according to FIG. 1.

FIG. 5 illustrates an alternative embodiment of the display 30. In this embodiment, fault indication is performed by means of points 54, located facing the graphic representations 56 of the potentiometers corresponding to the various tripping functions. In the figure, the point associated with the long delay function is darkened in, indicating that a long delay trip has taken place.

The invention is not limited to the particular embodiments represented in the figures. In particular, display can also be achieved by a plasma display. The information which is common to all the trip devices, whatever the type, such as the manufacturer's logo and name or the tripping curve coordinates, can be integrated in the liquid crystal display in such a way as to be permanently visible, even without a battery. This is achieved, in state-of-the-art manner, by fitting a transparent plate, under the front panel of the display, on which this information is printed.

The infra-red link can also be replaced by any other type of link, for example a radio link, an ultrasound link, or even a two-wire line.

The remote control devices can comprise keys instead of or in addition to the potentiometers. The remote control device may be replaced by a conventional microcomputer, connected to the trip device by a two-wire line. In this case, the data is selected and displayed on the microcomputer and transmitted via the line to the trip device microprocessor which displays it and subsequently uses it for processing. The latter type of remote control is more particularly suitable for configuration of the end-of-chain trip device.

I claim:

1. An electronic trip device comprising:
   an electronic processing unit, including a microprocessor and at least one back-up random-access memory, for receiving output signals from a measuring means that measures the current flowing in conductors to be protected and producing a tripping signal in the event that said signals overshoot preset tripping parameters;
   a front panel for displaying the tripping parameters and/or various quantities measured by the trip device, wherein the front panel consists essentially of a flat screen display device that is controlled by the microprocessor of the electronic processing unit and connected to an internal battery so as to give a permanent display of various data contained in the memory of the electronic processing unit including indications relating to the type of trip device, the tripping parameters and of fault indication; and
   receiving means connected to the microprocessor for cooperating with a transmission means of a remote control device that is capable of remotely modifying the tripping parameters contained in the memory.

2. The trip device according to claim 1, wherein the display device also displays the values of the quantities measured by the trip device.

3. The trip device according to claim 1, wherein the indications relating to the type of trip device are entered in the memory remotely by means of a specific remote control device.

4. The trip device according to claim 3, wherein the indications relating to the type of trip device are not subsequently modifiable, after they have been entered in the memory.

5. The trip device according to claim 1, wherein certain indications, common to all the trip devices, are integrated in the display device.

6. The trip device according to claim, 1, wherein the transmission means of the remote control device cooperate with the receiving means of the trip device by means of an infra-red link.

7. The trip device according to claim 1, wherein the transmission means of the remote control device cooperate with the receiving means of the trip device by means of a two-wire line.

8. The trip device according to claim 1, wherein the data is displayed in alphanumeric form and/or in graphic form.

9. The trip device according to claim 1, wherein the display device is a liquid crystal display device.

10. The trip device according to claim 1, wherein the display device is of the plasma type.

* * * * *